Figure 2:
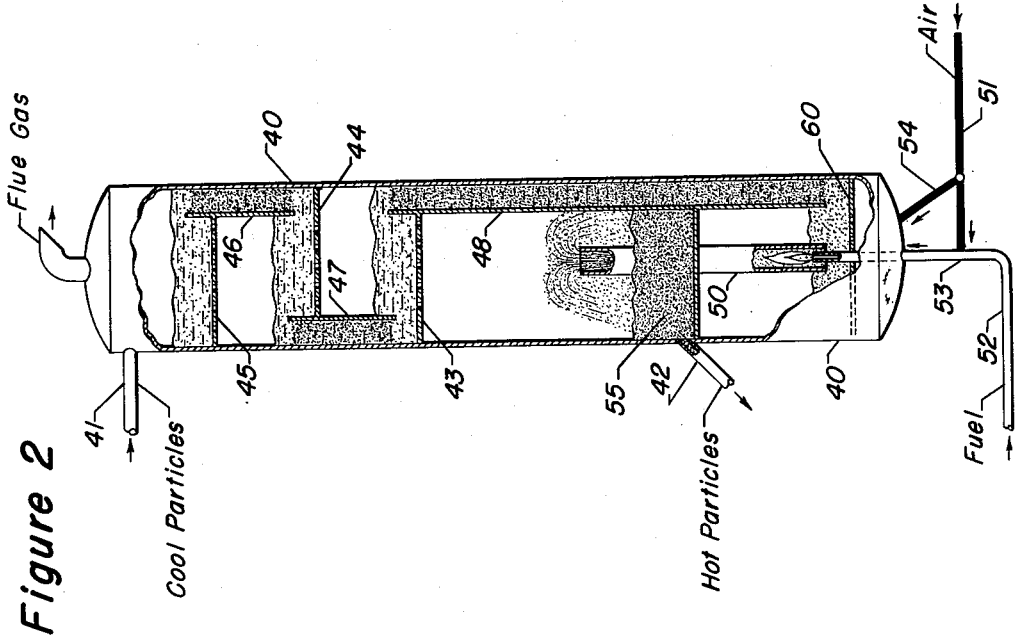

May 23, 1961  H. R. SCIVALLY ET AL  2,985,439
PARTICLE HEATER
Filed April 2, 1958

INVENTORS:
H. Robert Scivally
James H. Balentine
BY: Chester J. Giuliani
Glen R. Grunewald
ATTORNEYS.

United States Patent Office 2,985,439
Patented May 23, 1961

2,985,439

PARTICLE HEATER

Herschell Robert Scivally and James H. Balentine, Shreveport, La., assignors, by mesne assignments, to Universal Oil Products Company, Des Plaines, Ill., a corporation of Delaware Filed Apr. 2, 1958, Ser. No. 725,818

1 Claim. (Cl. 263—21)

This invention relates to a particle heater and particularly to a particle heater for uniformly heating flowing solid particles to high temperatures.

It is frequently desirable to heat solid particles to high temperatures. As characteristic examples of processes wherein high temperature particles are desired, calcination or oxidation of inorganic materials such as lime, silica, alumina, etc. in particle form is frequently effected in order to render them reactive. Another example is in so-called pebble heaters wherein heat is transferred to a fluid stream by contacting it with a flowing stream of hot inert particles such as sand, alumina, magnesia, limestone, etc. The use of pebble heaters is very prevalent, particularly where it is desired to heat a fluid stream to a high temperature. The usual method of heating a fluid stream by indirect heat transfer through the walls of metal tubes may not be employed reasonably where the temperature to which the fluid must be heated is in the range of 2000° F. or higher because of the inability of metal to maintain its structural qualities at these high temperatures. When employing a flowing stream of pebbles such as sand as a heat exchange medium, however, the fluid may be contacted within an internally insulated metal shell so that the fluid may be heated to exceedingly high temperatures, however, the internally insulated shell may remain relatively cool.

Pebble heaters are usually operated by employing two chambers, one a heating chamber wherein the pebbles or particles are contacted with hot combustion gases to raise their temperature after which they are separated from the combustion gases and passed through suitable conduits into a second chamber wherein the fluid stream contacts the pebbles thereby resulting in a hot fluid stream and a relatively cool pebble stream. The pebbles are then returned to the heating zone and the cycle is repeated.

This invention deals with a heating zone which is particularly designed to obtain improved results over those ordinarily employed. The heating zones employed frequently are merely chambers wherein fuel is burned with air beneath a bed of pebbles. This method of heating pebbles has many difficulties, the most obvious of which are that the pebbles are unevenly heated so that some become so hot that they fuse while others by-pass the hot portion of the vessel and are passed to the fluid heating zone in a relatively cool condition. Besides the inefficiency of this method, it produces local hot spots which damage equipment. Some pebbles are abruptly heated from a relatively cool temperature to a very hot temperature and experience thermal shocks that cause fragmentation and ultimate loss from the system. It is an object of this invention to provide a particle heater in which there is gradual countercurrent heating of particles, uniform heating of particles, no by-passing of the heating zone and direct control over the temperature of the flame providing the heat.

It is an embodiment of this invention to provide a particle heating apparatus comprising in combination an enclosed shell, a perforated plate across the cross-section of said shell dividing it into a convection heating chamber and a hot particle collecting chamber, an inlet for particles into said convection heating chamber, an outlet for particles from said convection heating chamber, a fuel-burning conduit discharging into said collecting chamber, means for passing particles from the outlet of said convection chamber to said fuel-burning conduit and a hot particle outlet from said collecting chamber.

Briefly, the apparatus of this invention comprises an ordinary shell with its interior divided into a convection heating chamber and a particle collecting chamber. The shell is divided by a perforated plate which permits hot combustion gases to pass from the particle collecting zone into the convection heating chamber and ultimately from an upper exhaust port thereby causing gradual relatively low temperature heating of cool particles which enter the top of the convection chamber and pass downwardly through it countercurrent to the hot gases. The particles cannot flow downwardly through the perforations in the dividing plate because of the up-coming gas, however, they pass through a separate conduit as a downwardly moving column, ultimately discharging directly into the flame from the burner. The flame from the burning fuel is confined in a conduit and the combustion products travel rapidly up the conduit discharging into the collection chamber which is disposed immediately below the convection heating zone. The particles from the convection heating zone pass directly into the flame within this conduit so that every particle is subjected not only to relatively low temperature convection heating but to direct contact with the flame. As a consequence, all particles are uniformly heated and controlling the flow rate of the particles provides a means for controlling the temperature of the flame because all particles will be introduced into the flame at substantially the same temperature. The high velocity combustion gases in the fuel-burning conduit entrain the particles causing them to pass up the conduit and discharge into the particle collecting zone wherein they are separated from the entraining gas due to its velocity decrease. Particles separated from the gas form a bed in the bottom of the collecting zone while the gas passes through the perforated plate hereinbefore described and into the convection heating zone. The hot particles in the collecting zone may be withdrawn and used for any suitable purpose.

Figure 1:
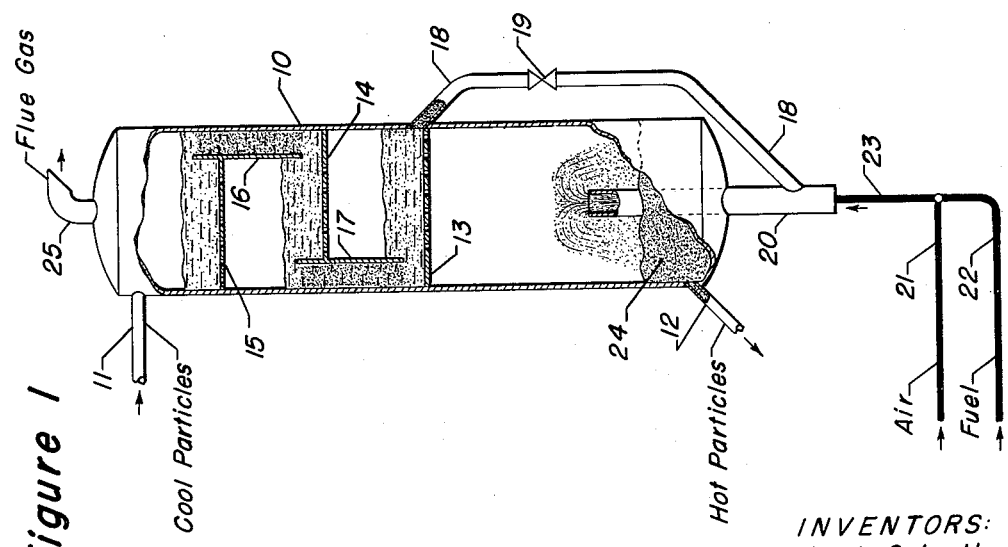

The accompanying drawings are presented to more clearly illustrate the apparatus of this invention and show in Figure 1 an embodiment of the invention employing an external burning zone and in Figure 2 a second embodiment of the invention employing an internal burning zone.

Referring to Figure 1, there is illustrated a shell 10 containing a cool particle inlet 11 and a hot particle outlet 12. The shell is divided by perforated plate 13 which separates it into an upper convection heating zone and a lower particle collecting zone. In this embodiment, to obtain more ideal countercurrent heating, the convection heating zone is divided into three stages by perforated plates 14 and 15 which contain conduits 16 and 17 respectively for passing particles from the uppermost to the lowermost stages of the convection heating zone. From the lower of the convection heating zones, that is, from immediately above plate 13, a conduit 18 passes from the shell. Conduit 18 passes a dense column of preheated particles downwardly through valve 19 and into the bottom of heating conduit 20. Air through line 21 and fuel through line 22 are mixed in line 23 and passed into heating conduit 20 wherein combustion is effected. The column of particles in conduit 18 discharge directly into the flame in conduit 20, are entrained in the combustion products and are passed upwardly into the collecting chamber wherein they form part of bed 24. The hot gases resulting from the combustion pass upwardly through plates 13, 14 and 15 and ultimately are discharged through exhaust pipe 25.

In this embodiment of the invention, the flow rate of particles through conduit 18 may be controlled by the operation of valve 19 thereby regulating the flame temperature in conduit 20. Furthermore, the external burning zone, which is relatively small compared with the rest of the apparatus, can be made of expensive, heat-resistant material without raising the price of the entire apparatus to a prohibitive amount. Furthermore, by attaching at least the lower portion of fuel-burning conduit 20 to vessel 10 with a flange or its equivalent, replacement of this member may be readily effected without extensive overhauling. In other words, the portions of the equipment experiencing severe thermal wear are highly localized and easily replaced.

Figure 2 represents a second embodiment of the same invention. In Figure 2, shell 40 contains a cool particle inlet 41, a hot particle outlet 42 and a perforated plate 43 which divides the shell into an upper convection heating zone and a lower particle collecting zone. In this case, as in the embodiment of Figure 1, the convection heating zone is divided by perforated plates 44 and 45 into three chambers, however, it is to be understood that employing a single chamber or any number of chambers in the convection heating zone is intended to be within the scope of this invention. Again, as in the previous figure, the heating zones are connected by downcomers 46 and 47 which may be any of those known to the art such as multiple conduits, single conduits, chordal sections, etc. The combustion gases passing upwardly through plates 43, 44 and 45 preheat the cool particles which gradually raises their temperature and avoids severe thermal shock later on in the heating process. The particles which are in fluidized state above plate 43 eventually enter conduit 48 where they form a dense descending column. The particles pass to another zone in the chamber below the particle collecting zone wherein they discharge onto perforated plate 60. Fuel through line 52 and air through line 51 mix in line 53 and pass into chamber 40 and the bottom of burning conduit 50. A portion of the air from line 51 passes beneath plate 60 so as to maintain the bed of particles on that plate in fluidized condition thereby causing them to enter the bottom of conduit 50 and to pass through the flame within the conduit and upwardly into the particle collection zone. This air also provides secondary air to aid in the combustion of fuel. As in the previous figure, the particles, due to deceleration of the gas as it enters the collection zone, separate from the gas and fall as part of bed 55 in the particle separating zone while the combustion gases, as hereinbefore described, pass upwardly through perforated plates 43, 44 and 45.

In the embodiment of Figure 2 there are several advantages. One advantage is that the internal piping causes a minimum of thermal strain in the equipment and is conservative of heat losses. In addition, when the outlet of internal conduit 48 is spaced close to a blank part of plate 60, it will maintain a seal separating the convection heating zone from the lowermost zone except through plate 43. In the embodiment of Figure 2, as in the embodiment of Figure 1, the extremely high temperatures of the process are confined to a relatively small area, mainly conduit 50 which can be constructed of heat-resistant material at a cost within reason.

From the foregoing, it is readily seen that the apparatus of the present invention provides an efficient, practical, means for heating particles in a manner that avoids uneven heating of particles, local hot spots in the equipment, by-passing of particles and thermal shock of the particles being heated.

We claim as our invention.

A particle heating apparatus comprising in combination an enclosed vertically elongated shell, a horizontal plate across said shell dividing it into an upper convection heating chamber and a lower hot particle collecting chamber, a particle inlet conduit connected to the upper portion of said convection heating chamber, a particle outlet conduit connected to the lower portion of said convection heating chamber, a vertical fuel-burning conduit extending upwardly into said collecting chamber and having an open upper end within the collecting chamber a substantial distance above the bottom thereof, means for introducing fuel and air into the lower end of said vertical conduit and for generating flame in the conduit, said particle outlet conduit connecting with the lower portion of said vertical fuel-burning conduit whereby particles from said convection heating chamber are passed directly into the flame in the fuel-burning conduit, said particles and combustion products discharging from said open upper end of the vertical conduit into said collecting chamber, perforations in said horizontal plate for the passage of combustion gases from the collecting chamber upwardly into the convection heating chamber, and a hot particle outlet conduit connected to the lower portion of said collecting chamber.

References Cited in the file of this patent
UNITED STATES PATENTS

| | | |
|---|---|---|
| 2,409,707 | Roetheli | Oct. 22, 1946 |
| 2,529,366 | Bauer | Nov. 7, 1950 |
| 2,698,171 | Schoenmakers et al. | Dec. 28, 1954 |